July 3, 1928.

F. E. ROBERTS

WINDSHIELD HEATER

Filed Feb. 1, 1926

1,675,911

Witness
David Bair

Inventor
Floyd E. Roberts
by Bair & Freeman Attorneys

Patented July 3, 1928.

1,675,911

UNITED STATES PATENT OFFICE.

FLOYD E. ROBERTS, OF MELBOURNE, IOWA.

WINDSHIELD HEATER.

Application filed February 1, 1926. Serial No. 85,193.

The object of my invention is to provide a windshield heater of simple, durable and comparatively inexpensive construction.

More particularly my invention relates to a device whereby the windshield through which the driver of an automobile views the way ahead of him is warmed to such an extent that ice will not adhere to the outside surface of the windshield and the inside will not become steamed or covered by a thin covering of moisture which prevents ordinarily the transparency of the windshield.

Still a further object is to provide an electrical heating element imbedded in the glass of the windshield wherein the windshield may be warmed to such an extent that the glass will be kept clear of any of the obstacles ordinarily interfering with the vision through the glass in cold weather.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
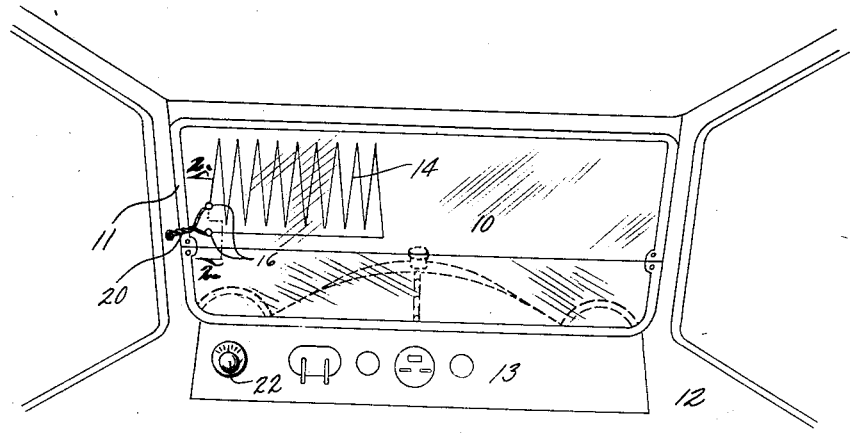
Figure 1, is a perspective view of the inside of an automobile of the enclosed type with my improved device installed in the windshield.
Figure 3:
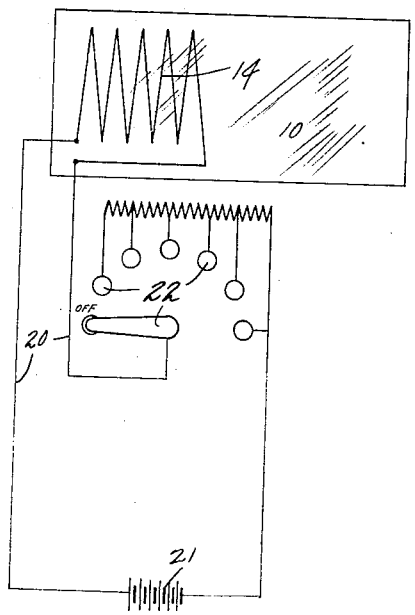
Figure 3 is a diagrammatic view of the electrical circuit for my device.

In the accompanying drawings I have used the reference numeral 10 to indicate a windshield which is mounted in a suitable frame 11 of the automobile 12. The automobile 12 includes a dash board 13 upon which the various control instruments are mounted.

The glass 10 has imbedded in it an electrical heating element 14 having its ends connected to lead sleeves 15 extending through openings formed in the windshield itself.

Figure 2:
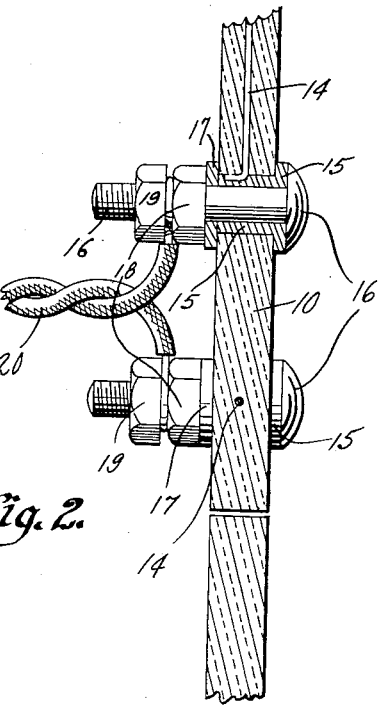
Figure 2, is an enlarged sectional view taken on line 2—2 of Figure 1.

The sleeve 15 has a shoulder or flange on its outer end as clearly shown in Figure 2 of the drawings.

A contact post 16 is mounted in each sleeve 15 and has a washer 17 of compressible material on its inner end which abuts against the inner surface of the windshield 10.

A locking nut 18 is mounted on each contact post 16 and engages the washer 17.

A second nut 19 is mounted on each of the posts 16 and is designed to receive between itself and the nut 18, the electric wires 20 which forms part of an electric circuit 21.

The electirc circuit 21 includes a battery or electric supply and a rheostat control 21 which may be mounted upon the instrument or dash board 13.

The rheostat control permits the heating element to be slightly heated if desired or heated to a greater extent, if desired.

The wires 20 may be disconnected during the summer months if desired, wherein the windshield may be opened in the ordinary manner.

The sleeves 15 are of conductive material and connect the contact posts 16 with the heating element 14.

The washer 17 of compressible material prevents any possible breaking of the windshield 10 when the contact posts are tightened in the sleeves 15.

My device is very efficient in that it enables the windshield to be kept in such a condition as will not in any way interfere with the vision therethrough.

The heating element itself is so spaced and placed within the glass of the windshield as not to interfere or affect the vision.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In combination with a sheet of glass or the like having an opening formed therein and a wire imbedded in the glass with one end extending into said opening, an electrical connection comprising a soft metal bushing of the same diameter as the opening, said bushing being forced into said opening whereby the extending end of the wire in said opening is imbedded in said bushing and means for connecting a source of electric current to said bushing.

2. In combination with a sheet of glass or the like having an opening formed therein and a wire imbedded in the glass with one end extending into said opening, an electrical connection comprising a soft metal bushing, flanged at one end and having its body portion of the same diameter as the opening, said bushing being forced into said opening whereby the extending end of the wire in said opening is imbedded in said bushing, a bolt extending through said bushing and having a nut on the side of the glass opposite the flange of the bushing and a soft metal washer interposed between the nut and the glass and means for connecting a source of electric current to said bushing.

FLOYD E. ROBERTS.